(12) United States Patent
Bellabal et al.

(10) Patent No.: US 9,121,347 B2
(45) Date of Patent: Sep. 1, 2015

(54) LINK BETWEEN THE EXHAUST CASING AND A STRUCTURAL RING OF THE FAN DUCT OF A JET ENGINE

(75) Inventors: Francois Robert Bellabal, Fontainebleau (FR); Guilhem Seize, Corbeil Essonnes (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 421 days.

(21) Appl. No.: 13/577,550

(22) PCT Filed: Feb. 9, 2011

(86) PCT No.: PCT/FR2011/050276
§ 371 (c)(1),
(2), (4) Date: Oct. 3, 2012

(87) PCT Pub. No.: WO2011/098728
PCT Pub. Date: Aug. 18, 2011

(65) Prior Publication Data
US 2013/0014515 A1    Jan. 17, 2013

(30) Foreign Application Priority Data
Feb. 10, 2010 (FR) ..................... 10 50949

(51) Int. Cl.
*F01D 25/28* (2006.01)
*F02C 7/20* (2006.01)
(Continued)

(52) U.S. Cl.
CPC ............... *F02C 7/20* (2013.01); *F01D 21/045* (2013.01); *F01D 25/28* (2013.01); *F02K 3/06* (2013.01); *F01D 25/24* (2013.01); *F05D 2240/14* (2013.01); *Y02T 50/671* (2013.01)

(58) Field of Classification Search
CPC ....... F02C 7/20; F05D 2240/14; F01D 25/28; F01D 25/24; F01D 25/285; F01D 21/045; B64D 27/26–27/268; F02K 3/06; Y02T 50/671
USPC ............ 60/797, 796; 248/637, 554, 555, 556, 248/557; 244/54; 415/9, 142
See application file for complete search history.

(56) References Cited

U.S. PATENT DOCUMENTS 5,921,500 A * 7/1999 Ellis et al. ........................ 244/54
6,669,393 B2 * 12/2003 Schilling ........................... 403/2
(Continued)

FOREIGN PATENT DOCUMENTS

| CN | 2592744 Y | 12/2003 |
| CN | 101446070 A | 6/2009 |
| WO | 2010 007220 | 1/2010 |

OTHER PUBLICATIONS

International Search Report issued on May 9, 2011 in PCT/FR11/050276 filed on Feb. 9, 2011.
(Continued)

*Primary Examiner* — Phutthiwat Wongwian
*Assistant Examiner* — Alain Chau
(74) *Attorney, Agent, or Firm* — Oblon, McClelland, Maier & Neustadt, L.L.P.

(57) ABSTRACT

An assembly including an outer ring of an exhaust casing, a structural ring of an external duct of a fan channel and of a two-flow jet engine that is concentric relative to the outer ring of the exhaust casing, and at least one first and second linking arm or rod forming a hyperstatic link by being attached by one end to the outer ring of the exhaust casing and, by the other end, to the structural ring. The link formed by the first linking arm or rod is configured to break when a predetermined load is exceeded, and the second linking arm or rod is configured to form a force-transmission path between the rings when the link is broken.

9 Claims, 2 Drawing Sheets

(51) Int. Cl.
  *F01D 21/04* (2006.01)
  *F02K 3/06* (2006.01)
  *F01D 25/24* (2006.01)

(56) References Cited

U.S. PATENT DOCUMENTS

| | | | |
|---|---|---|---|
| 7,093,996 B2 * | 8/2006 | Wallace et al. | 403/78 |
| 7,313,920 B2 * | 1/2008 | Stretton et al. | 60/797 |
| 2005/0022501 A1 | 2/2005 | Eleftheriou et al. | |
| 2005/0109013 A1 | 5/2005 | Eleftheriou et al. | |
| 2007/0241257 A1 * | 10/2007 | Eleftheriou et al. | 248/554 |
| 2007/0246603 A1 * | 10/2007 | Udall et al. | 244/54 |
| 2008/0240917 A1 | 10/2008 | Eleftheriou et al. | |
| 2008/0307795 A1 | 12/2008 | Bader et al. | |
| 2010/0290903 A1 * | 11/2010 | Heyerman et al. | 415/213.1 |
| 2011/0073745 A1 | 3/2011 | Duchatelle et al. | |

OTHER PUBLICATIONS

U.S. Appl. No. 13/821,465, filed Mar. 7, 2013, Bellabal, et al.

* cited by examiner

LINK BETWEEN THE EXHAUST CASING AND A STRUCTURAL RING OF THE FAN DUCT OF A JET ENGINE

BACKGROUND OF THE INVENTION

1. Field of the Invention

The present invention relates to the field of two-flow jet engines comprising an elongate secondary flow duct. It relates to the engines of this type which are secured to the fuselage of the aircraft or to military engines.

2. Description of the Related Art

A two-flow jet engine comprises a fan which, when it is at the front of the engine, provides a flow of compressed air which is separated into two concentric annular flows, i.e. a primary flow and a secondary flow which surrounds the primary flow. The latter is guided towards the gas generator part of the engine, which comprises compression stages, a combustion chamber, and a turbine section by means of which the fan is driven. The primary flow containing the combustion gases is then ejected into an exhaust pipe. The secondary flow is rectified downstream from the fan, and is itself ejected. In civilian engines it provides the substantial part of the thrust.

According to one configuration, the secondary flow is guided in a by-pass duct which extends around the engine between the fan and the exhaust pipe of the primary flow, and comprises two coaxial, substantially cylindrical walls which delimit an annular space between one another. The inner wall of the by-pass duct forms the envelope of the gas generator. The outer wall of the by-pass duct forms a duct which extends from the plane of the rectifier fins as far as the level of the exhaust pipe. The outer duct of the by-pass duct is designated in the field by the acronym OFD (outer fan duct).

The engine can be fitted under the wing of the aircraft or along its fuselage, and in particular towards the rear. In this case, the engine comprises a by-pass duct as previously described. The attachments of the engine to the aircraft are situated at the level of two transverse planes, i.e. an upstream plane which passes via the upstream structural casing, designated as the intermediate casing, and a downstream plane which passes via the downstream structural casing, designated as the exhaust casing.

In the case of fitting onto the fuselage, in order to assure the downstream securing, a structural ring is provided on the outer duct of the by-pass duct, i.e. the OFD, this ring being connected by arms or connecting rods to the ferrule or outer ring of the exhaust casing. Patent application EP 2022973 in the name of the applicant describes an example of the structure of the by-pass duct outer duct.

The link between the two above-described rings can be in the form of radial arms which are distributed all around the axis of the engine, and are secured rigidly to the two rings. The link can also be in the form of connecting rods which are inclined relative to the axis of the engine. The connecting rods are secured to the two rings by attachments of the clevis and pin type. An attachment of this type is formed by two, single or double clevises, which are integral, one of them with the end of the connecting rod, and the other with the wall of the ring, and a common pin passes through them.

More particularly, the connecting rods are arranged in pairs, the connecting rods of each pair being tangent to the ring of the exhaust casing, whilst being convergent on an attachment of the ring of the outer duct of the by-pass duct.

Whether the link is formed by radial arms or connecting rods, it is hyperstatic; the forces thus pass via all the arms or connecting rods. In the solutions according to the prior art, all the elements of the link, i.e. pins, clevises, connecting rods or arms, have dimensions such as to withstand mechanically the forces which would be derived from the imbalance generated by the loss of a vane in the engine. The objective is to avoid the risk of the engine stalling if such a critical situation were to arise. The weight of the assembly which forms the link is consequently heavy. In addition, since the forces which can result from breakage of a vane are potentially transmitted to all the arms or connecting rods, the ring of the outer duct of the by-pass duct must also be able to withstand these loads around its entire circumference. Its size is therefore designed accordingly.

BRIEF SUMMARY OF THE INVENTION

The objective of the present invention is to provide a link between the two above-described rings which, whilst assuring absorption of the forces of the type generated by breakage of a fan blade, make it possible to reduce the weight of the assembly relative to solutions according to the prior art.

The object of the invention is also to provide a link which does not modify the structure of the assembly.

The object of the invention is also a solution which can be applied to any form of link between the two rings, consisting of arms with rigid mountings or connecting rods which are secured by means of pins which pass through clevises.

The objective of the invention is achieved by means of an assembly comprising an exhaust casing ring, a structural ring of an outer duct of the by-pass duct of a two-flow jet engine which is concentric relative to the ring of the exhaust casing, and at least one first and one second arm or connecting rod which form(s) a hyperstatic link, whilst being secured at one end to the ring of the exhaust casing, and at the other end to the structural ring of the outer duct, characterized in that the link which is formed by the first arm or connecting rod is designed to be broken when it is subjected to a load in excess of a predetermined load, and the second arm or connecting rod is designed to form a path for transmission of the forces between said rings when said link is broken.

The predetermined load is advantageously greater than the limit load, and smaller than the load which would be generated by the breakage of a blade, of the fan in particular. By means of the invention, since there is definition of the elements of the link which must assure the transmission of the forces in the case when this critical situation occurs, it is possible to lighten the other elements and save weight.

According to another characteristic, the structural ring of the outer duct of the by-pass duct comprises a means for suspension of the jet engine on the structure of an aircraft, and the second arm or connecting rod is then closer to said suspension than the first arm or connecting rod. In the same manner as for the arms or connecting rods, by determining the paths of the forces in the situation of breakage of a blade, dimensioning with a reduced weight is made possible.

The invention can be implemented in different manners. The following embodiments are non-exhaustive:

The first arm or connecting rod has dimensions such as to buckle when it is subjected to said predetermined load.

The assembly comprises at least a first and a second one of said arms, and said arms are arranged radially relative to the axis of the rings.

The assembly comprises a first and a second one of said connecting rods, the attachments of which are of the type with pins and clevises, and the first connecting rod comprises at least one attachment which breaks when it is subjected to said predetermined load.

More particularly, according to this last embodiment, the assembly comprises at least two pairs of connecting rods which are inclined relative to the radial direction, and in particular tangentially relative to the exhaust casing ring, with at least one pair of said first connecting rods and at least one pair of said second connecting rods.

When the link comprises three pairs of connecting rods, two pairs of connecting rods advantageously form said first connecting rods, and one pair forms said second connecting rods.

For example, one pair of said first connecting rods comprises a fusible pin of the attachment to the ring, which pin can break when it is subjected to the predetermined load, the pin of the second pair of connecting rods being fitted with a polarizing means. In particular, the polarizing means is formed by the difference in the diameters of the heads of said fusible pin and pin of the attachment of the second pair of connecting rods, and by the diameter of the passage of the head of the pin of the attachment of the second pair of connecting rods.

The invention also relates to the two-flow jet engine with a front fan and a secondary flow duct which extends downstream from the fan at least as far as the plane of the exhaust casing comprising an assembly such as previously described.

BRIEF DESCRIPTION OF THE SEVERAL
VIEWS OF THE DRAWINGS

Other characteristics and advantages will become apparent from the following description of different embodiments, the description being accompanied by attached drawings in which.

Figure 2:
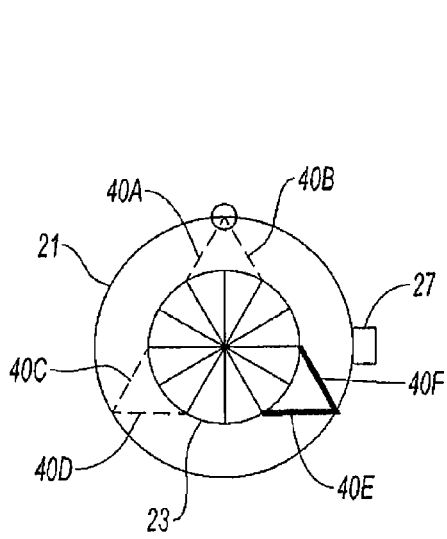
FIG. 2 represents schematically a transverse cross section of the engine in FIG. 1, passing via the two structural rings of the outer duct of the by-pass duct and the outer duct of the exhaust casing.
Figure 3:
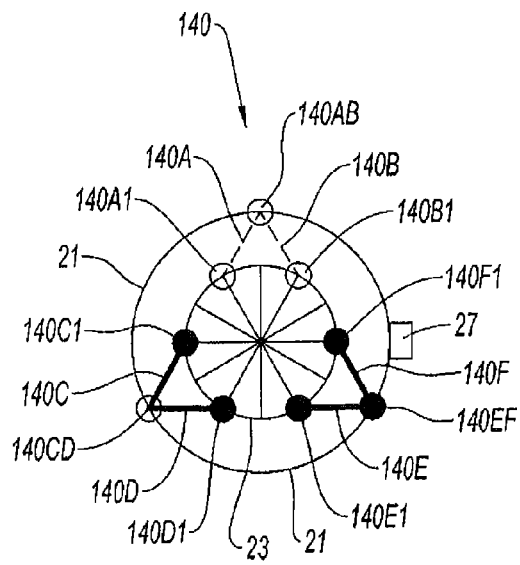
Figure 4:
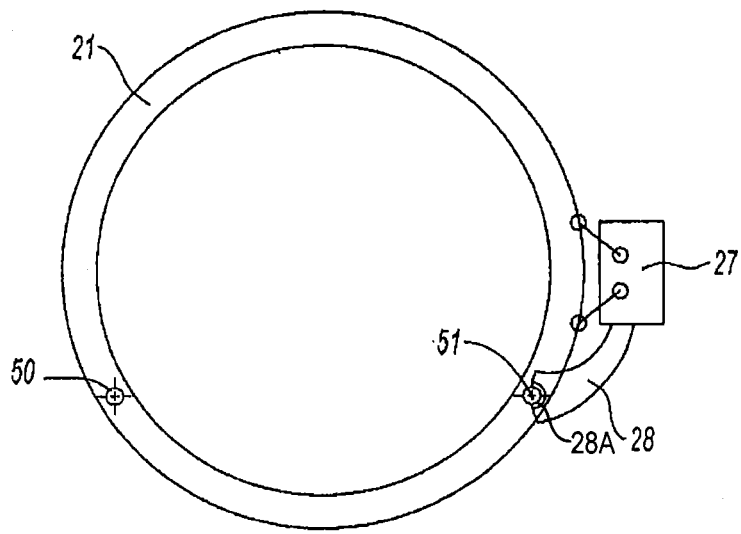
Figure 5:
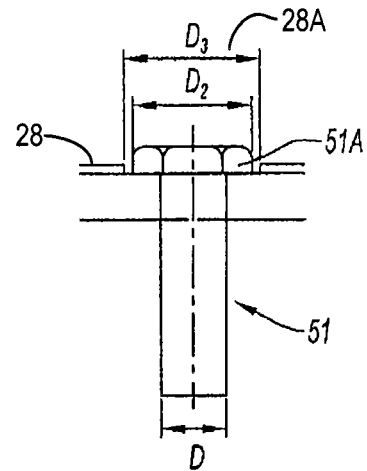
Figure 6:
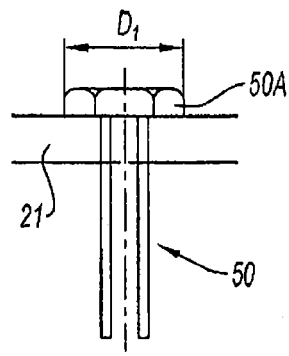
Figure 7:
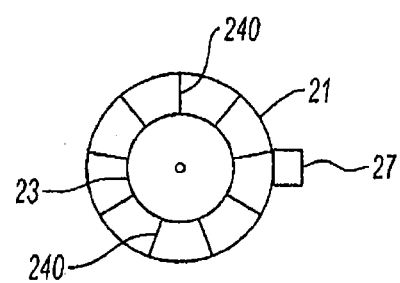

FIG. 3 represents a variant of the link in FIG. 2;
FIG. 4 represents a fusible pin with a hollow rod;
FIG. 5 represents a non-fusible pin;
FIG. 6 shows a fitting with a polarizing unit; and
FIG. 7 shows a variant link with radial arms.

DETAILED DESCRIPTION OF THE INVENTION

Figure 1:
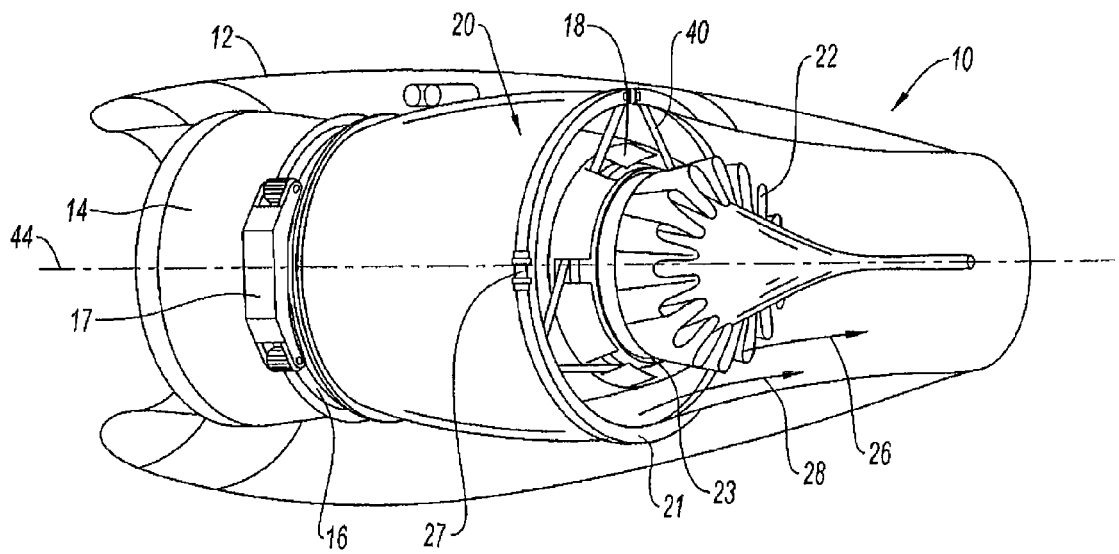
FIG. 1 is a schematic view in perspective of a two-flow jet engine.

FIG. 1 represents a two-flow jet engine 10 with a front fan inside a pod 12, and comprising, going from upstream towards downstream, a fan casing 14, an intermediate casing 16 and an annular by-pass duct which is provided between two substantially cylindrical ducts, with an inner duct 18 forming the envelope of the part of the engine through which the primary flow travels, forming a gas generator, and an outer duct 20. The outer duct 20 of the by-pass duct extends in this case as far as downstream of the area of confluence between the primary flow 26 and the secondary flow 28, where the two flows are mixed by the mixer 22. The outer duct 20 of the by-pass duct has a structural function, whilst assuring absorption of the forces between the engine and the aircraft on which it is fitted. It thus comprises a structural ring 21, which in this case is connected by connecting rods 40 to the outer ring 23 of the exhaust casing of the gas generator. The engine is secured upstream to the aircraft by means of an attachment 17 which is integral with the intermediate casing, and downstream by means of an attachment 27 which is integral with the structural ring 21 of the outer duct 20 of the by-pass duct.

In the example represented, the link between the structural ring 21 of the outer duct of the by-pass duct and the ring 23 of the exhaust casing is formed by connecting rods 40 which are secured by their ends to the two rings. As is known, and is not represented, each mounting comprises a clevis which is integral respectively with the ring and the end of the connecting rod, the two clevises having a common pin which passes through them. As can be seen in the figure, the link is formed more specifically by three pairs of connecting rods 40, which are tangent to the ring 23 of the exhaust casing, and converge in pairs on the outer structural ring 21.

Whereas, according to the prior art, the elements which constitute the link between the rings have dimensions such that each of them can transmit the forces if a fan blade were to break, according to the invention the elements of the link are sized differently. The link comprises fusible elements, i.e. which give way when they are subjected to a load which is greater than a predetermined load. This predetermined load is advantageously smaller than the blade loss load, which corresponds to the ultimate load, whilst remaining greater than the limit load. Said limit load is defined as being the load beyond which no deterioration of said fusible elements is acceptable. The link also comprises non-fusible elements which have dimensions such as to withstand the load which arises if a blade breaks, in particular a fan blade. These elements assure the transmission of the forces between the engine and the attachment to the aircraft, after the fusible elements have broken.

FIG. 2 illustrates a first embodiment of the invention. It represents a schematic view in transverse cross-section perpendicular to the axis 44 of the engine which passes via the link between the two rings 21 and 23. As in the example in FIG. 1, the link comprises three pairs of connecting rods 40, respectively 40A and 40B; 40C and 40D, 40E and 40F. The connecting rods are secured to each of the rings 21 and 23 respectively by attachments of the clevis and pin type, in a known manner which is not represented. The connecting rods are positioned relative to the attachment 27 of the structural ring 21 of the outer duct of the by-pass duct 20. The attachment to the fuselage of an aircraft is lateral, i.e. to the right, defined looking towards upstream, or to the left, according to whether the engine is fitted on one side or the other of the fuselage.

Two pairs of first connecting rods 40A, 40B, and 40C, 40D have dimensions such as to buckle when they are subjected to said predetermined loads. In practice their buckling dimensions are such as to withstand 1.1 times said limit loads. For their part, the pins and clevises of the attachments of the fusible connecting rods have dimensions such as not to break until the connecting rods have buckled.

The second connecting rods 40E and 40F have dimensions such as to resist and not break when they are subjected to said predetermined loads and to the loads corresponding to the loss of a blade. It should be noted that the second connecting rods are amongst the connecting rods which form the link amongst those which are closest to the attachment 27. The path of forces which separates the point of convergence of the two second connecting rods 40E and 40F from the attachment is shorter than the path which the forces may travel between the points of convergence of the first attachments and the attachment 27. Thus, firstly the lever arm between the point of convergence and the attachment is minimal, and secondly it is sufficient to reinforce this portion of the structural ring 21, which constitutes a possibility of global lightening of the structure.

When a fan blade breaks, substantial imbalance is generated by the resulting lack of balance of the rotor; this imbalance is transmitted downstream to the downstream securing plane. According to the invention, the first connecting rods buckle, and the load is transmitted to the attachment by the second connecting rods 40E and 40F, and the path along the outer structural ring 21.

FIG. 3 represents a variant embodiment in which the fusible elements are arranged in the attachments. The link 140 between the two same rings 21 and 23 comprises three pairs of connecting rods. The first connecting rods 140A and 140B are connected to the rings by the attachments 140A1, 140B1 and 140AB, respectively to the outer ring of the exhaust casing 23 and to the structural ring 21. These first connecting rods are fusible, either by being able to buckle, or by means of their attachments, in particular the pins which pass through the clevises.

Another pair of first connecting rods is formed by the connecting rods 140C and 140D; these first connecting rods in this case have dimensions such as to withstand the blade breakage loads. Only the attachment 140CD of the connecting rods to the structural ring 21 is fusible; the other attachments 140C1 and 140D1 are not fusible. The pins of the attachments 140A1, 140B1, 140AB and 140CD advantageously have dimensions such as to withstand 1.1 times the limit loads determined for transverse buckling.

The second connecting rods 140E and 140F are not fusible, either in the case of the connecting rods themselves or their attachments 140E1, 140F1 and 140EF.

The operating principle is the same as previously in the case of breakage of a fan blade. The link formed by the first connecting rods 140A, 140B, 140C and 140D gives way, and the one formed by the second connecting rods is resistant and assures transmission of the forces. As in the preceding solution, the second connecting rods are arranged as close as possible to the attachment 27, so that the lever arm is as weak as possible.

The variant in FIG. 3 has the advantage, in the case when the fitting on the fuselage of the aircraft has to be changed from right to left, of needing to change only the pins 140CD and 140EF, and inverting them because of the symmetry relative to the vertical plane which passes via the axis of the engine. In the case when this variant is adopted, it is necessary to associate with it a polarizing unit which prevents the risk of inverting the fusible pins of the attachments 140CD and 140EF during fitting.

An example of a polarizing unit is illustrated in FIGS. 4 to 6. The fusible pin 50 which is represented in FIG. 4 is hollow, and has lower strength than the non-fusible pin 51. In order to distinguish them, the diameter D1 of the head 50A of the pin 50 is larger than the diameter of the pin D2 of the head 51A of the pin 51. FIG. 6 shows a polarizing means. The structural ring 21 of the outer duct of the by-pass duct comprises with the attachment 27 a plate 28 which is fitted on one side on the attachment 27, and on the other side on the plane where the head 51A of the non-fusible pin 51 is supported. This plate 28 has a notch 28A with a width D3 which is wide enough to allow the head 51A with a diameter D2 to be accommodated in it, but not the head 50A with a diameter D1, since D1>D2. Thus, during the fitting, the fitter will not be able to introduce the fusible pin into the receptacle for securing of the second connecting rods.

The invention has been described with a link formed by three pairs of connecting rods. The scope of the invention also includes application of the solution to a link with eight connecting rods, or also a different number of connecting rods.

FIG. 7 shows a schematic example of a link 240 with arms arranged radially between the outer ring 23 of the exhaust casing and the structural ring of the outer duct of the by-pass duct. The solution is applied mutatis mutandis.

The invention claimed is:

1. An assembly comprising:
   an outer ring of an exhaust casing;
   a structural ring of an outer duct of a by-pass duct of a two-flow jet engine which is concentric relative to the outer ring of the exhaust casing; and
   a first pair of connecting rods and a second pair of connecting rods forming a hyperstatic link, first ends of the first and second pairs of the connecting rods being secured to the outer ring of the exhaust casing, and second ends of the first and second pairs of the connecting rods being secured to the structural ring,
   wherein the first pair of connecting rods are configured to break when subjected to a predetermined load, and the second pair of connecting rods are configured to not break when subjected to the predetermined load and to form a path for transmission of forces between the outer ring of the exhaust casing and the structural ring when the first pair of connecting rods are broken, and
   wherein a first pin passes through the second ends of the first pair of connecting rods and a second pin passes through the second ends of the second pair of connecting rods; and
   wherein the first pin is a fusible pin, which can break when the first pin is subjected to the predetermined load, and the second pin includes a polarizing system for distinguishing the second pin from the first pin.

2. The assembly as claimed in claim 1, wherein the structural ring comprises an attachment which attaches the jet engine on a structure of an aircraft, the second pair of connecting rods being closer to the attachment than the first pair of connecting rods.

3. The assembly as claimed in claim 1, wherein the first pair of connecting rods are sized to buckle when subjected to the predetermined load.

4. The assembly as claimed in claim 1, wherein the polarizing system is formed by a difference in diameters of heads of the first fusible pin and the second pin, and by a diameter of a passage of the head of the second pin.

5. The assembly as claimed in claim 4, wherein the second pin passes through a plate which is fitted on one side of an attachment which attaches the jet engine on a structure of an aircraft.

6. The assembly as claimed in claim 1, wherein attachments of the first and second pairs of connecting rods are of type with pins and clevises, and the first pair of connecting rods include at least one attachment that breaks when the first pair of connecting rods are subjected to the predetermined load.

7. The assembly as claimed in claim 6, wherein the first and second pairs of connecting rods are inclined relative to a radial direction, and are tangentially relative to the exhaust casing ring.

8. The assembly as claimed in claim 7, further comprising a third pair of connecting rods, the third pair of connecting rods are configured to break when subjected to the predetermined load.

9. A two-flow jet engine with a front fan and a secondary flow duct which extends downstream from the fan at least as far as a plane of the exhaust casing comprising an assembly according to claim 1.

\* \* \* \* \*